(12) United States Patent
Dickinson, Jr.

(10) Patent No.: US 6,350,506 B2
(45) Date of Patent: Feb. 26, 2002

(54) TEXTURED SURFACE AND METHOD

(75) Inventor: James E. Dickinson, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/147,870

(22) PCT Filed: Sep. 8, 1997

(86) PCT No.: PCT/US97/15897

§ 371 Date: Mar. 17, 1999

§ 102(e) Date: Mar. 17, 1999

(87) PCT Pub. No.: WO98/12697

PCT Pub. Date: Mar. 26, 1998

Related U.S. Application Data

(60) Provisional application No. 60/026,207, filed on Sep. 17, 1996.

(51) Int. Cl.[7] .................................................. B32B 3/30
(52) U.S. Cl. ..................... 428/156; 428/141; 428/155; 428/64.2; 428/65.3; 428/694 SG; 219/121.69; 360/135; 427/554; 427/555; 264/400
(58) Field of Search ................................. 428/141, 156, 428/155, 64.2, 65.3, 694 SG; 219/121.69; 360/135; 427/554, 555; 264/400

(56) References Cited

U.S. PATENT DOCUMENTS

| | | | |
|---|---|---|---|
| 5,062,021 A | * 10/1991 | Ranjan et al. | 360/135 |
| 5,427,833 A | 6/1995 | Nakayama et al. | 428/64 |
| 5,473,138 A | * 12/1995 | Singh et al. | 219/121.69 |
| 5,494,721 A | 2/1996 | Nakagawa et al. | 428/64.1 |
| 5,534,321 A | 7/1996 | Alpha et al. | 428/64.2 |
| 5,550,696 A | * 8/1996 | Nguyen | 360/135 |
| 5,567,484 A | * 10/1996 | Baumgart et al. | 427/555 |
| 5,586,040 A | 12/1996 | Baumgart et al. | 364/474.08 |
| 5,595,768 A | * 1/1997 | Treves et al. | 425/174.4 |
| 5,626,941 A | 5/1997 | Ouano | 428/141 |
| 5,741,560 A | * 4/1998 | Ross | 427/555 |
| 5,798,164 A | * 8/1998 | Weiss et al. | 428/141 |
| 5,846,628 A | * 12/1998 | Kuroe et al. | 428/65.3 |
| 5,875,084 A | * 2/1999 | Baumgart et al. | 360/135 |
| 5,955,154 A | * 9/1999 | Xuan et al. | 427/555 |

* cited by examiner

*Primary Examiner*—William P. Watkins, III
(74) *Attorney, Agent, or Firm*—Milton M. Peterson

(57) ABSTRACT

A glass, glass-ceramic, or ceramic body having a textured pattern over at least a portion of its surface, the pattern comprising depressed, conical areas at spaced intervals on the surface, and a method of producing the depressed conical areas that employs laser radiation.

15 Claims, 2 Drawing Sheets

TEXTURED SURFACE AND METHOD

This application claims the benefit of U. S. Provisional Application, Ser. No. 60,026, 207, filed Sep. 17, 1996 and PCT Application, Ser. No. PCT/US97/15897, filed Sep. 9, 1997.

FIELD OF THE INVENTION

A textured glass, glass-ceramic, or ceramic surface, particularly for use as a magnetic memory disk substrate, and method of texturing.

BACKGROUND OF THE INVENTION

For certain applications, it is necessary to produce a roughened, or textured, surface on a glass, glass-ceramic, or ceramic surface. An application of current interest is the substrate for a magnetic memory disk.

A magnetic memory storage device consists essentially of a head pad, or slider, and a rigid information disk. The head pad supports an element capable of magnetically reading or writing data on the information disk. The information disk is composed of a rigid substrate carrying a coating of magnetic media which stores information.

Technical development in the computer field has led to demand for increased disk capacity and higher a real density. In order to thus read and write data, a recording head must fly closer to the surface of the disk. As a consequence, the characteristics of the substrate become even more critical with the trend being to flatter, smoother surfaces.

As the recording head moves closer to the media, it is essential that the coefficient of friction of the substrate/ media surface be low. The characteristics that lead to low friction are low bearing area and surface roughness. These are in conflict with surface characteristics that promote low glide, low noise, and high bit densities, i.e., smooth and flat surfaces. As a result, this conflict causes compromises to be made in surface design, i.e., not too smooth to cause frictional problems, but sufficiently smooth to foster low glide.

It is conventional practice to employ an information disk having an aluminum substrate upon which a nickel-phosphorous alloy may be plated. To satisfy technical requirements, it has been proposed to at least partially texture the surface on the substrate. Various texturing means have been proposed including stamping, abrading and etching techniques.

More recently, it has been proposed to produce a textured surface area, on either the metal substrate or alloy coating, by a laser treatment. In particular, it has been proposed to index a Nd:YAG or Nd:YLF laser over the surface to produce a pattern of cavities or pits.

Certain problems have been encountered in using a metal substrate. The thin metal tends to lack rigidity and body strength. It is also prone to surface damage. This has led to a search for an alternative material.

U.S. Pat. No. 4,971,932 (Alpha et al.) describes the fabrication of memory storage devices using a glass-ceramic material as the substrate for the disk. A glass-ceramic containing a silicate as the predominant crystal phase is disclosed for that purpose.

The patent states that its glass-ceramic substrate exhibits very high body strength and fracture toughness; also a much harder surface than aluminum metal. The inherently textured surface of a glass-ceramic was thought to be of special value because no special texturizing operation would be required. The surface texture of the glass-ceramic surface could be tailored to a particular average roughness value through base composition selection, or by grinding and polishing, or by chemical etching.

U.S. Pat. No. 5,534,321 (Alpha et al.) proposes a substrate having a surface divided into two parts: (1) a smooth area exhibiting a $R_{pv}$ value less than about 10 nm, and (2) a low friction area exhibiting a $R_{PV}$ value greater than about 10 nm, conventionally up to about 50 nm. The application further proposes using as a substrate material a photonucleable glass such as described in U.S. Pat. No. 2,628,160 (Stookey). These glasses are capable of being rendered chemically sculpturable, that is, etchable in a selected area. The procedure involves a combination of exposing the selected area to short-wave radiation and a subsequent heat treatment. A disk substrate of the glass was found to be capable of being treated so that the two required surface textures are produced on one surface. The patent is incorporated by reference for further details.

The procedure described by Alpha et al. was technically effective in producing the desired texture on a substrate. However, like any etching procedure, it was neither simple, nor inexpensive, to practice. Accordingly, a more practical alternative became desirable.

The present invention provides an alternative means of texturing a surface on a glass, a glass-ceramic, or a ceramic body. The method is convenient to practice while permitting close dimensional control of the texture produced. It is generally applicable, but is particularly useful in producing a magnetic head substrate that has either an overall, or a partially, textured surface. Thus, it may be employed to produce a substrate with an annular textured area such as described in the Alpha et al. -321 patent.

SUMMARY OF THE INVENTION

The article of the invention is a glass, glass-ceramic, or ceramic body having a textured pattern over at least a portion of its surface, the pattern comprising depressed, conical areas at spaced intervals on the surface.

The invention further resides in a method of texturing at least a portion of a surface on a glass, a glass-ceramic, or a ceramic body, the method comprising exposing the surface to laser radiation having a wavelength that is substantially absorbed by the material of the surface, continuing the exposure for a time, and at an intensity, such that a cavity of desired depth is formed.

BRIEF DESCRIPTION OF THE DRAWINGS

In the accompanying drawing.

PRIOR ART

In addition to literature referred to above, further items of possible interest are listed in a separate document.

DESCRIPTION OF THE INVENTION

The present invention was developed as a method of texturing an annular section of a smooth-surfaced, glass-ceramic memory disk substrate. The following description, then, is oriented accordingly. However, the broader applicability of the invention to glass, glass-ceramic and ceramic surfaces in general will be readily apparent. Also, the texturing may cover a total surface, or only a part thereof.

Figure 1:
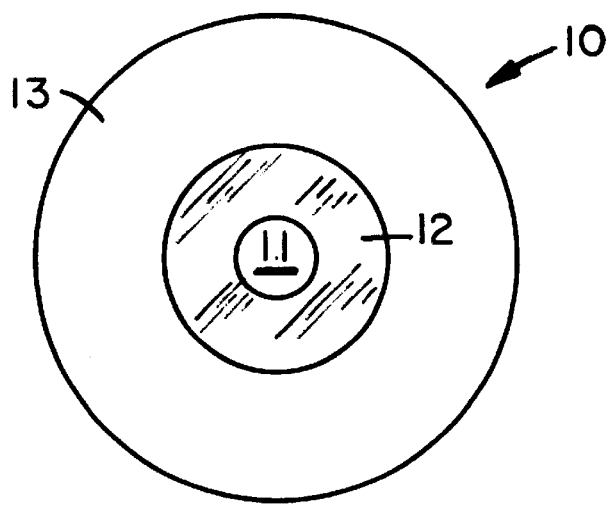
FIG. 1 is a schematic top plan view of a substrate for an information disk.

In the accompanying drawing, FIG. 1 is a schematic, top plan view of a substrate for an information disk generally designated by the numeral 10. Substrate 10 fundamentally comprises a circular opening 11, an annular, inner portion 12 surrounding opening 11, and an annular, outer portion 13 surrounding portion 12. Circular opening 11 is provided to mount the disk on a spindle.

Annular, inner portion 12 is textured to provide a low stiction area on the finished substrate. The textured surface is produced in accordance with the invention as subsequently described. It minimizes stiction between the head and the substrate, thus providing a surface on which the head can land.

Outer annular portion 13 is a smooth surface that may be produced by grinding and polishing the entire surface of a disk prior to texturing inner portion 12. An extremely smooth surface finish is obtainable on a polished glass or glass-ceramic disk substrate. This allows a head to fly closer to the disk, thereby increasing storage capacity.

The present invention is based on discovery of a unique method for producing the textured pattern required for inner portion 12 of disk 10. It will be appreciated that, if desired, the entire surface of disk 10 might be textured in the same manner. Also, the pattern produced may be an annular pattern as shown in FIG. 1, a linear pattern, or a pattern of other desired configuration.

The present invention is based on discovery that a cavity, or depressed area, or a plurality of such cavities, can be formed in a glass, a glass-ceramic, or a ceramic surface by exposure of that surface to laser radiation. The dimensions of the cavity, in particular its depth, may be varied by controlling the intensity and duration of the radiation.

The areal dimension of a cavity will depend mostly on the focus of the laser radiation. The depth will generally increase with time and intensity of the radiation, and the cavity will be of an inverted, conical nature.

Laser radiation is ideal for producing a textured surface. Its directed nature, and its ability to be tailored in terms of power density, wavelength and pulse time and rate, enable it to produce a desired texture. For optimum results, the material being textured should be maximally absorbing at the wavelength of the laser radiation. This ensures that all of the energy is deposited at the surface being textured. It eliminates potential changes to the bulk of the sample.

For most purposes, a plurality of cavities or depressions are required. In that event, either the laser or the body being textured may be translated periodically. In producing disk 10, with a textured area 12, the translation may be in a circular manner to create a series of circular "furrows" in the area 12.

Figure 2A:
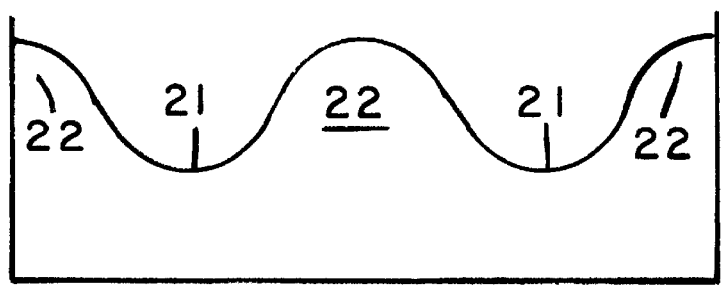
FIGS. 2a and 2b are idealized side views in cross-section of surfaces textured in accordance with the invention.
Figure 2B:
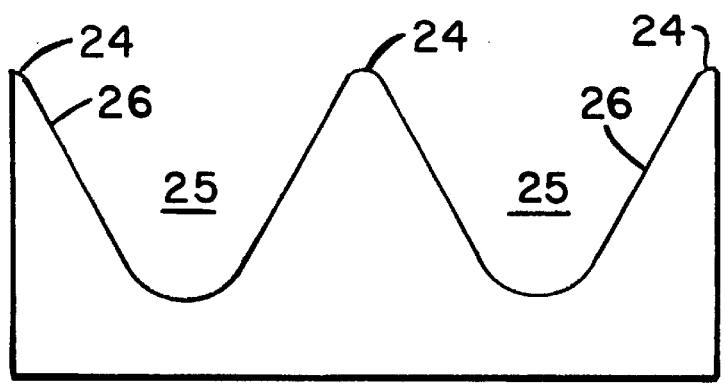

FIGS. 2a and 2b illustrate the nature of textured surfaces obtainable in accordance with the present invention.

FIG. 2a is an idealized side view in cross-section of a textured surface 20 greatly enlarged for illustration. It shows the conical nature of the depressions 21, the intermediate regions 22, and the general geometry of the "furrow" produced by translation along a line on a surface.

FIG. 2b is a view similar to FIG. 2a showing peaks 24 and valleys, or depressed cavities, 25. Here, the peaks rise slightly above the normal disk surface as shown by the dotted lines 26. This is more typical of a surface desired for the textured zone of a disk.

It will be appreciated that a perforated mask may be employed. This permits forming a plurality of depressions at one time. However, such a procedure is not preferred since it requires greater energy, and provides less control of the process.

Figure 3:
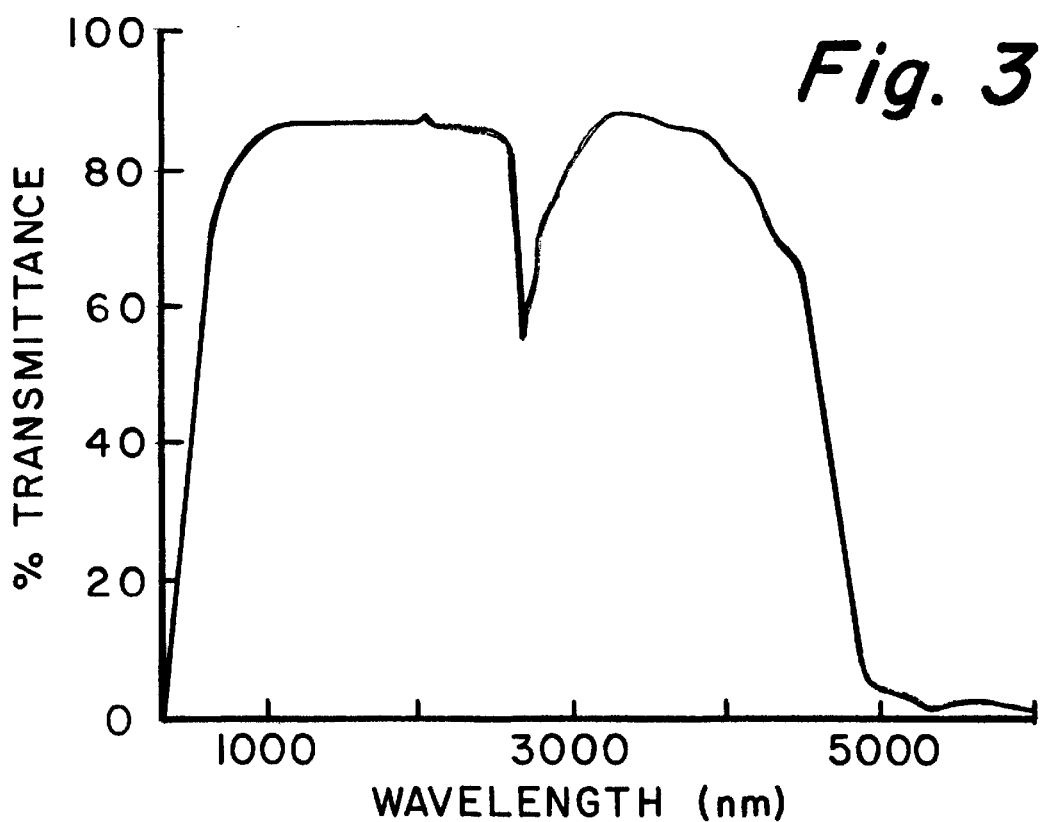
FIG. 3 is a graphical representation showing effective radiation for purposes of the present invention.

FIG. 3 in the drawing shows the optical transmission curve for a typical glass-ceramic substrate material employed in research studies that led to the present invention. The composition of the glass-ceramic, expressed in weight percent on an oxide basis, is:

| | |
|---|---|
| $SiO_2$ | 46.9 |
| $Al_2O_3$ | 24.8 |
| MgO | 15.0 |
| ZnO | 1.8 |
| $TiO_2$ | 11.5 |

The glass-ceramic was prepared in conventional manner by mixing and melting a suitable glass batch and forming articles of desired shape from the glass melt. The articles were then heat treated on a conventional thermal schedule to nucleate the glass and form a crystalline network characteristic of a glass-ceramic.

In FIG. 3, transmittance is plotted in % on the vertical axis, and wavelength in nanometers (mn) on the horizontal axis. The transmission curve shows that ultraviolet radiation shorter than about 300 nm is totally absorbed. Likewise, radiation longer than about 5000 nm (5 microns) is also totally absorbed by this material. This means that UV lasers, which operate at wavelengths below 300 nm are particularly effective with this material. Likewise, $CO_2$ lasers, which operate at about 10 microns, are also ideally suited for texturing the surface of this glass-ceramic.

The curve further indicates that the glass-ceramic material has a high transmittance value of about 85% at 1.06 microns. This indicates that an Nd:YAG laser, which operates at 1.06 microns, and which has been used on metal surfaces, would be appreciably less effective for texturing this glass-ceramic material because of its low absorption. It will be appreciated that the absorption characteristics of a particular material should be determined initially before selecting a suitable laser for the texturing step.

Ultraviolet radiation corresponds to electromagnetic radiation having a wavelength from about 10 nm to about 400 nm. It includes vacuum UV, having a wavelength of about 10 to 200 nm, quartz UV, having a wavelength of about 200–400 nm, ultraviolet-A, having a wavelength of 280–320 nm, and ultraviolet-B, having a wavelength of 315–400 nm, radiation. Preferably, the ultraviolet radiation has a wavelength from about 193 to about 351 nm, more preferably from about 193 to about 250 nm.

Laser radiation is substantially coherent, substantially monochromatic radiation which results from photon stimulated emission. Any laser which can produce radiation in the range from about 10 to 400 nm and deliver the proper power per unit area ("fluence") can be used. A wide range of lasers are suitable for practicing the invention, including excimer lasers. Details regarding the construction and operation of lasers are described in Hecht, *The Laser Guidebook,* 2nd ed, New York: McGraw Hill (1992).

Suitable excimer lasers include the rare gas halide excimer lasers, such as those which employ ArF, KrCl, KrF, XeCl, and XeF and which emit 193, 222, 248, 308, and 351 nm radiation, respectively. Radiation having other ultraviolet wavelengths can be produced by Raman shifting the standard excimer lines. Preferably, the ultraviolet laser radiation is excimer laser radiation produced by a rare gas halide excimer laser.

The term excimer laser does not describe a single device, but rather a family of lasers with similar output characteristics. All emit powerful pulses lasting nanoseconds, or tens of nanoseconds, at wavelengths in or near the ultraviolet.

To test the efficacy of the method, a glass-ceramic disk was exposed through a perforated mask to laser radiation. The laser employed was an excimer UV laser operating at 193 nm and 30 mJ/cm$^2$. One test piece was exposed to ten pulses from the laser. A depressed pattern, corresponding to the perforated pattern in the mask, was observable after the test. A second test piece was exposed to 100 pulses. This produced a clearly delineated pattern.

Figure 4:
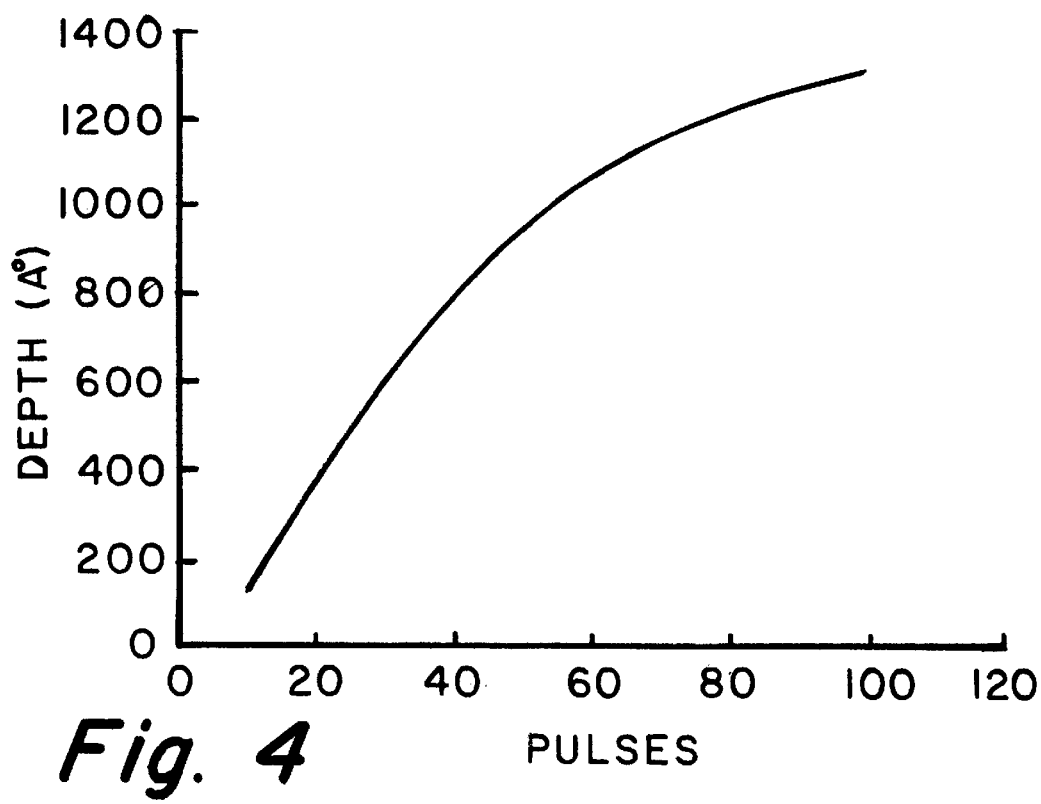
FIG. 4 is a graphical representation showing the relationship between depth of texturing produced and time of radiation exposure.

FIG. 4 is a graphical representation in which depth of a cavity produced by excimer laser exposure is plotted against number of pulses. Depth values in Angstroms are plotted on the vertical axis. Pulses are plotted on the horizontal axis. It is apparent that the cavity depth increases with the number of pulses. However, the rate of increase is non-linear. The significant information, with respect to magnetic disk substrate production, is that only about 10 pulses are required to produce the desired pattern for the landing-zone region, that is, region 12 in FIG. 1.

As FIG. 4 indicates, cavity depths from about 10 to about 1400 Å are obtainable. For disk substrate purposes, a depth of about 100 Å is considered desirable.

A $CO_2$ laser texturing experiment was carried out to demonstrate the applicability of longer wavelength radiation. In this case, about 30 watts of power was used and the beam was pulsed at about 1 msec intervals. The sample was translated under the beam to produce a series of "furrows". A profilimeter trace across the furrows shows them to be 3.272 microns in depth and about 100 microns wide. Thus, a $CO_2$ laser can also be used to texture a controlled area in glass-ceramic substrate material. The choice of the type of laser to use, and the exact process requirements, are material dependent. They are also dependent on the type of texture required.

There does appear to be a difference in the effects created by lasers operating at ultraviolet wavelengths, e.g. an excimer laser, and a $CO_2$ laser. The former is believed to be operative at temperatures below the melting point of the material being textured. This is based on the lack of buildup around the cavity. This suggests that molecular bonds are broken and the material atomized.

In contrast, cavities produced by a $CO_2$ laser do show some buildup. Also, the base of the cavity shows microcracking such as would be expected in cooling of molten glass. These observations indicate the effective temperature is above the melting point.

I claim:

1. A glass, glass-ceramic, or ceramic, memory disk substrate having a smooth surface with at least a portion of that smooth surface having a textured pattern formed therein that comprises depressed, open areas of conical shape at spaced intervals within that smooth surface without any buildup around and above the rim of the depressed, open areas in the smooth surface.

2. A method of producing a memory disk substrate which comprises providing a flat sheet of glass, glass-ceramic, or ceramic, forming a smooth surface on that flat sheet, exposing an area on that smooth surface to the focused radiation of an excimer laser at a wavelength that is substantially absorbed by the surface material, continuing the exposure at an intensity and for a time sufficient to create a depression of predetermined depth in the exposed area while maintaining the remaining surface smooth without any buildup around and above the rim of the depressed, open areas in the smooth surface.

3. A memory disk substrate in accordance with claim 1 wherein the textured pattern covers the entire surface area.

4. A memory disk substrate in accordance with claim 1 wherein the surface consists of a textured area and a relatively smooth area.

5. A memory disk substrate in accordance with claim 1 wherein the depressed conical areas are in a linear, circular, or spiral pattern.

6. An memory disk substrate in accordance with claim 1 wherein the textured area has a roughness value $R_{PV}$ greater than 10 Å and the smooth area has a roughness value $R_{PV}$ less than 10 Å.

7. An memory disk substrate in accordance with claim 6 wherein the $R_{PV}$ value of the textured area is in the range of 10–1400 Å.

8. An memory disk substrate in accordance with claim 7 wherein the $R_{PV}$ value is about 100 Å.

9. A method in accordance with claim 2 which comprises exposing the surface at spaced intervals to create a pattern of depressions in the surface.

10. A method in accordance with claim 2 which comprises indexing the memory disk substitute or the laser with respect to the other to create the pattern.

11. A method in accordance with claim 2 which comprises exposing the surface to create a linear circular or spiral pattern.

12. A method in accordance with claim 2 wherein the laser emits radiation at a wavelength less than 300 nm.

13. A method in accordance with claim 2 wherein the predetermined depth in the exposed area is in the range of 10–1400 Å.

14. A memory disk substrate in accordance with claim 1 wherein the body is a glass-ceramic.

15. A memory disk substrate in accordance with claim 11 wherein the depressed, conical areas are created by exposure to focused radiation at a wavelength less than about 300 nm.

* * * * *